United States Patent
Suzuki et al.

(10) Patent No.: US 7,004,872 B2
(45) Date of Patent: Feb. 28, 2006

(54) CONTROL METHOD AND DEVICE FOR AUTOMATIC TRANSMISSION

(75) Inventors: Fuminori Suzuki, Okazaki (JP); Akira Takagi, Obu (JP)

(73) Assignee: Denso Corporation, Kariya (JP)

( * ) Notice: Subject to any disclaimer, the term of this patent is extended or adjusted under 35 U.S.C. 154(b) by 73 days.

(21) Appl. No.: 10/790,209

(22) Filed: Mar. 2, 2004

(65) Prior Publication Data

US 2004/0176204 A1   Sep. 9, 2004

(30) Foreign Application Priority Data

Mar. 3, 2003   (JP)   ............................. 2003-055812

(51) Int. Cl.
*F16H 31/00*   (2006.01)

(52) U.S. Cl. .................. 475/116; 475/123; 475/128; 477/149; 477/155; 477/160; 192/3.58

(58) Field of Classification Search ................ 475/116, 475/123, 128; 477/149, 155, 160, 906; 192/3.58
See application file for complete search history.

(56) References Cited

U.S. PATENT DOCUMENTS

| | | | | |
|---|---|---|---|---|
| 4,845,618 A | * | 7/1989 | Narita | 701/58 |
| 4,942,787 A | * | 7/1990 | Aoki et al. | 477/152 |
| 4,955,256 A | * | 9/1990 | Kashihara et al. | 477/152 |
| 5,086,670 A | * | 2/1992 | Nitz et al. | 477/154 |
| 5,251,509 A | * | 10/1993 | Pollack et al. | 475/127 |
| 5,790,967 A | * | 8/1998 | Kull et al. | 701/51 |

FOREIGN PATENT DOCUMENTS

JP   1-224549   9/1989

\* cited by examiner

*Primary Examiner*—Charles A. Marmor
*Assistant Examiner*—David D. Le
(74) *Attorney, Agent, or Firm*—Nixon & Vanderhye P.C.

(57) ABSTRACT

A control method for an automatic transmission is capable of quickly determining whether gear shifting is permissive. The control method varies the command value input to an engaging-side electromagnetic valve that adjusts a hydraulic pressure applied to a frictional element to be engaged in a target gear in a specific time period, then determines a time variation in another time period of the hydraulic pressure applied to the frictional element that is adjusted by the engaging-side electromagnetic valve according to the input command value and detected by a detecting means. Determination of whether gear shifting is permissive or not on the basis of the time variation is thus determined.

10 Claims, 9 Drawing Sheets

CONTROL METHOD AND DEVICE FOR AUTOMATIC TRANSMISSION

CROSS REFERENCE TO RELATED APPLICATIONS

This application is based upon, claims the benefit of priority of, and incorporates by reference Japanese Patent Application No. 2003-55812 filed Mar. 3, 2003.

BACKGROUND OF THE INVENTION

1. Field of the Invention

The present invention relates to a method and device for controlling an automatic transmission.

2. Description of the Related Art

Generally, a control device is known that controls gear shifting of an automatic transmission by applying oil pressure to a plurality of frictional elements of the automatic transmission. In such automatic transmission control devices, if any anomaly occurs in an electromagnetic valve or pressure control valve that adjusts the oil pressure to be applied to the frictional elements, it becomes impossible to apply correct oil pressure to the frictional elements. To cope with such problem, decision as to whether gear shifting is permissive or not has been conducted by monitoring a nomalies by means of an oil pressure switch which electrically detects if the oil pressure applied to the frictional elements has reached a threshold value (see Japanese Patent Laid-Open Publication No. Hei 1-224549). If a threshold value is reached, a fail-safe valve is mechanically activated.

However, neither the oil pressure switch nor the fail-safe valve is activated unless oil pressure applied to the frictional elements reaches the threshold value. In some cases,however,it is more difficult than in normal cases to vary the oil pressure that is applied to the frictional elements to engage or release them for shifting to a target gear and in such cases it will take more time for the applied oil pressure to reach the threshold value. This means that it takes more time to detect an anomaly and hence to judge whether the gear shifting is permissive or not, and thus the gear shifting cannot be conducted rapidly.

SUMMARY OF THE INVENTION

An object of the present invention is to provide a method and device for controlling an automatic transmission that can rapidly determine whether gear shifting is permissive or not.

A control method and control device according to a first aspect and ninth aspect of the present invention are constructed such that a command value given to a pressure adjusting means is varied, and it is determined whether gear shifting is permissive or not based on the time variation of the hydraulic pressure applied to a frictional element that is adjusted by the pressure adjusting means according to the command value and detected by a detecting means. By monitoring the time variation of the applied hydraulic pressure in this manner, it is made possible torapidly determine whether the gear shifting is permissive or not rapidly without waiting for the applied hydraulic pressure to reach a predetermined value.

A hydraulic pressure applied to a frictional element to be engaged in a target gear (engaging-side frictional element) is herein defined as an "engaging-side applied hydraulic pressure," and a command value for causing the pressure adjusting means to adjust the hydraulic pressure applied to a frictional element to be released in a target gear (releasing-side frictional element) to a maximum pressure is defined as a "complete engagement command value."

The control method and control device according to a second aspect and tenth aspect of the present invention determine that gear shifting is to be prohibited if the engaging-side applied hydraulic pressure detected by the detecting means does not vary when the command value is varied, namely if the engaging-side frictional element is not engaged. According to the present invention in which the time variation in applied hydraulic pressure is monitored, any change in the applied hydraulic pressure can be detected correctly in a short period of time and hence a determination of prohibiting the gear shifting can be made quickly and correctly when such an anomaly that the applied hydraulic pressure does not vary is present. Moreover, after the determination, the complete engagement command value is given to the pressure adjusting means so that the engaging state is maintained without releasing the releasing-side frictional element. Thus, it is possible to reliably prohibit gear shifting.

The control method and control device according to a third aspect and eleventh aspect of the present invention determine that gear shifting is to be permitted if an applied hydraulic pressure detected by the detecting means varies when the command value is varied. Since, according to the present invention, the time variation of the applied hydraulic pressure is monitored and thereby any change in the applied hydraulic pressure can be detected correctly in a short period of time, it is possible to make a determination to permit the gear shifting rapidly and correctly when the applied hydraulic pressure varies. Moreover, after making such a decision, a permissive command value is given to the pressure adjusting means so that the applied hydraulic pressure is adjusted to a hydraulic pressure for attaining the target gear. Thus, it is possible to perform the gear shifting reliably.

The control method and control device according to a fourth aspect and twelfth of the present invention estimate a time variation of applied hydraulic pressure based on a command value that has been varied. If the estimated variation matches the actual time variation, a permissive command value is given to the pressure adjusting means during normal timing. Thereby, it is possible to shift the gear to a target gear in a normal period of time if the applied hydraulic pressure normally varies in response to the change of the command value.

The control method and control device according to a fifth aspect and thirteenth aspect of the present invention correct the normal timing if the estimated variation does not match actual time variation and then give a permissive command value to the pressure adjusting means at the corrected timing. Thereby, in a case when the applied hydraulic pressure varies in response to the change of the command value but the time variation of the applied hydraulic pressure exhibits an anomaly, it is possible to shift to the target gear in a period of time adjusted in consideration of such an anomaly.

Here, the permissive command value for causing the pressure adjusting means to adjust the hydraulic pressure applied to the releasing-side frictional element to a minimum pressure is defined as a "complete release command value."

In a case that the time variation of the engaging-side applied hydraulic pressure that is detected by the detecting means when the command value is varied does not match the estimated variation, the complete release command value cannot be given to the pressure adjusting means at a normal timing because it will break the balance of relationship between the timing for releasing the releasing-side frictional element and the timing for engaging the engaging-side frictional element, and hence deteriorate the gear shifting performance. To solve this problem, the control method and control device according to a sixth aspect and a fourteenth aspect of the invention give the complete release command value to the pressure adjusting means at a corrected timing if the time variation of the engaging-side applied hydraulic pressure does not match the estimated variation. The corrected timing is determined so as not to break the balance of the relationship between the timing for releasing the releasing-side frictional element and the timing for engaging the engaging-side frictional element, and thereby the deterioration of the gear shifting performance can be prevented.

The control method and control device according to a seventh aspect and fifteenth aspect of the invention vary the command value after a passage for transmitting the engaging-side applied hydraulic pressure has been filled with working fluid, and determine an estimated variation to be compared with time variation of the engaging-side applied hydraulic pressure. Since the command value is varied in the state where the passage is filled with working fluid and a desired hydraulic pressure can be assuredly applied to the engaging-side frictional element, the calculation for estimating time variation of the engaging-side applied hydraulic pressure can be conducted easily. Therefore, it is possible to obtain the estimated variation correctly and to improve the accuracy of the decision of whether a gear shifting is permissive or not.

The control method and control device according to an eighth aspect and sixteenth aspect of the invention determine whether gear shifting is permissive or not on the basis of a plurality of time variations obtained in time series. Therefore, the accuracy of judgment can be improved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

(First Embodiment)

Figure 2:
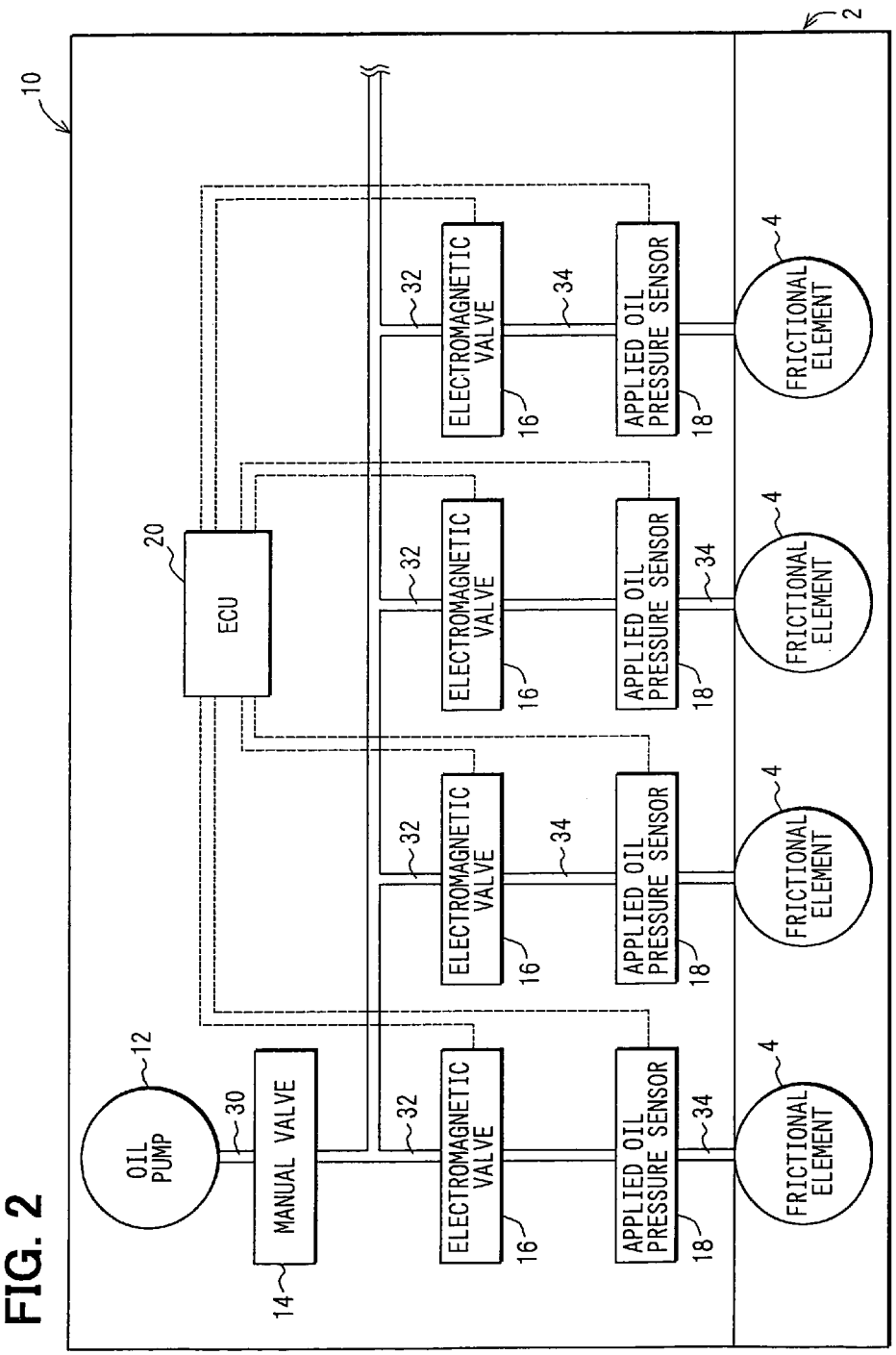
FIG. 2 is a block diagram of a control device for an automatic transmission according to the first embodiment of the present invention.

A control device for an automatic transmission according to a first embodiment of the present invention is illustrated in FIG. 2. The control device 10 according to the first embodiment is mounted on a vehicle together with an automatic transmission 2 for controlling the gear shifting operation of the automatic transmission 2.

The automatic transmission 2 employs a plurality of frictional elements 4 such as clutches in a sheave. The plurality of frictional elements 4 are engaged or released independently according to hydraulic oil pressure applied thereto by the control device 10. When a drive position (D) is selected by the shift lever of the vehicle, the automatic transmission 2 shifts the gear in accordance with the combination, among the frictional elements 4, of engaged ones and released ones. In the present embodiment, a couple of the frictional elements 4 are engaged for one gear. In order to shift from one gear to a successive gear, one of the couple of frictional elements 4 that are engaged with each other in the original gear is released while another frictional element 4 is engaged, so that the shift to the target gear is attained.

The control device 10 comprises an oil pump 12, a manual valve 14, a plurality of electromagnetic valves 16, a plurality of applied oil pressure sensors 18, and an electronic control unit (ECU) 20. The oil pump 12 is a mechanically or electrically driven pump. The oil pump 12 is connected with a communicating path 30 to discharge hydraulic oil drawn from an oil pan (not shown) to the communicating path 30. The pressure of the hydraulic oil discharged by the oil pump 12 is used line pressure. The manual valve 14 is arranged on the communicating path 30. The manual valve 14 is mechanically or electrically connected with a shift lever so that, when the D position is selected by the shift lever, the manual valve 14 opens the communicating path 30 to transmit the line pressure to the downstream side.

Each of the plurality of electromagnetic valves 16, which constitute a pressure adjusting means, is connected to one of a plurality of communicating paths 32 that branch from the downstream end of the connecting path 30 so that each of the electromagnetic valves 16 generates output pressure on the basis of line pressure transmitted to the corresponding communication path 32. The electromagnetic valves 16 are electrically connected to the ECU 20 to adjust the respective output pressures according to a command value provided by the ECU 20. The frictional elements 4 of the automatic transmission 2 are each connected to one of the plurality of electromagnetic valves 16 via respective separate communicating paths 34, whereby the output pressure transmitted to the corresponding communicating path 34 from the corresponding electromagnetic valve 16 is applied to each of the frictional elements 4 as applied oil pressure.

Each of the plurality of applied oil pressure sensors 18 constituting a detecting means is provided to one of the plurality of communication paths 34 to detect the oil pressure applied to the corresponding frictional element 4 from the corresponding electromagnetic valve 16 via the corresponding communicating path 34. Operation of the applied oil pressure sensors 18 is controlled by the ECU 20 that is electrically connected therewith, and a signal representing applied oil pressure detected by the sensor 18 is output to the ECU 20.

The ECU 20 constituting a judging or determining means is a microcomputer comprising a CPU and a storage device. The ECU 20 controls the electromagnetic valves 16, the applied oil pressure sensors 18, and so on according to a control program stored in the storage device.

Figure 3:
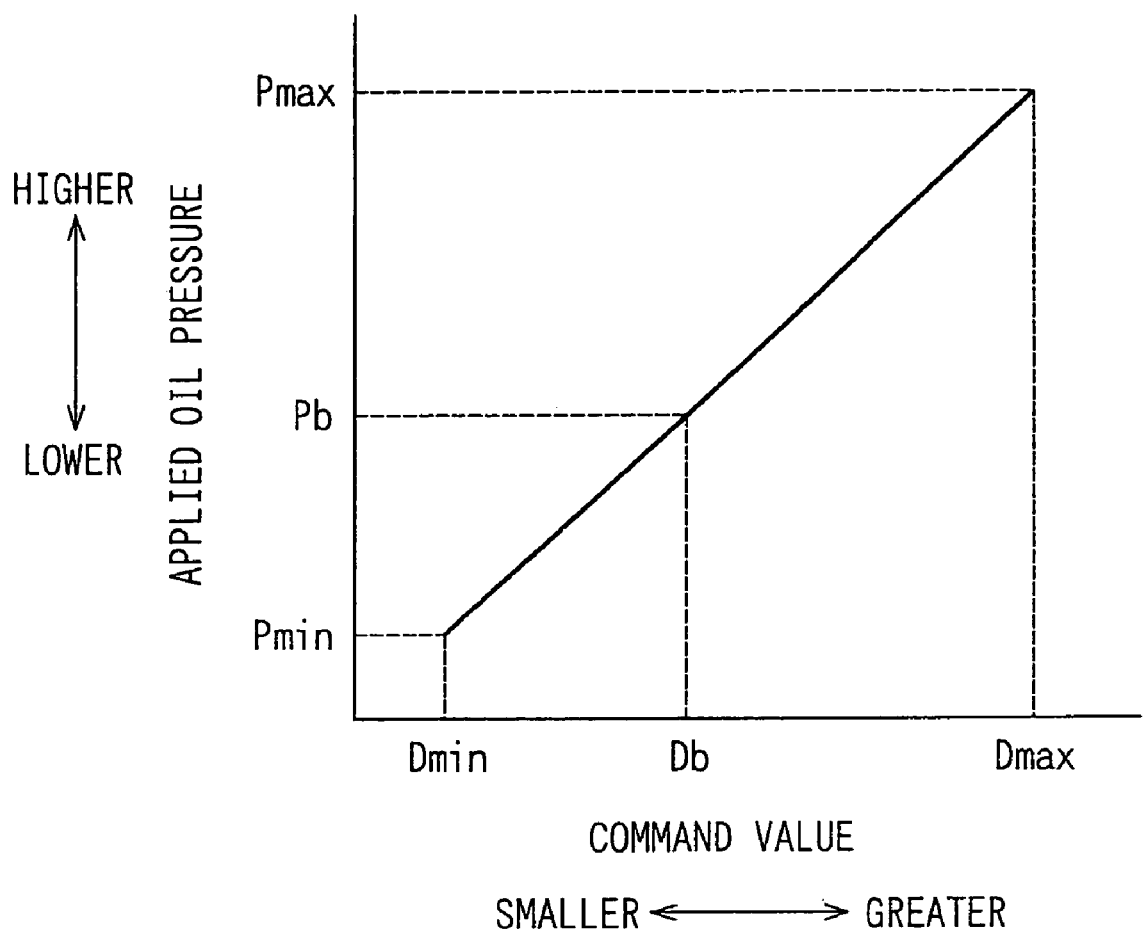
FIG. 3 is a graph of the operation of the control device for the automatic transmission according to the first embodiment of the present invention.
Figure 4:
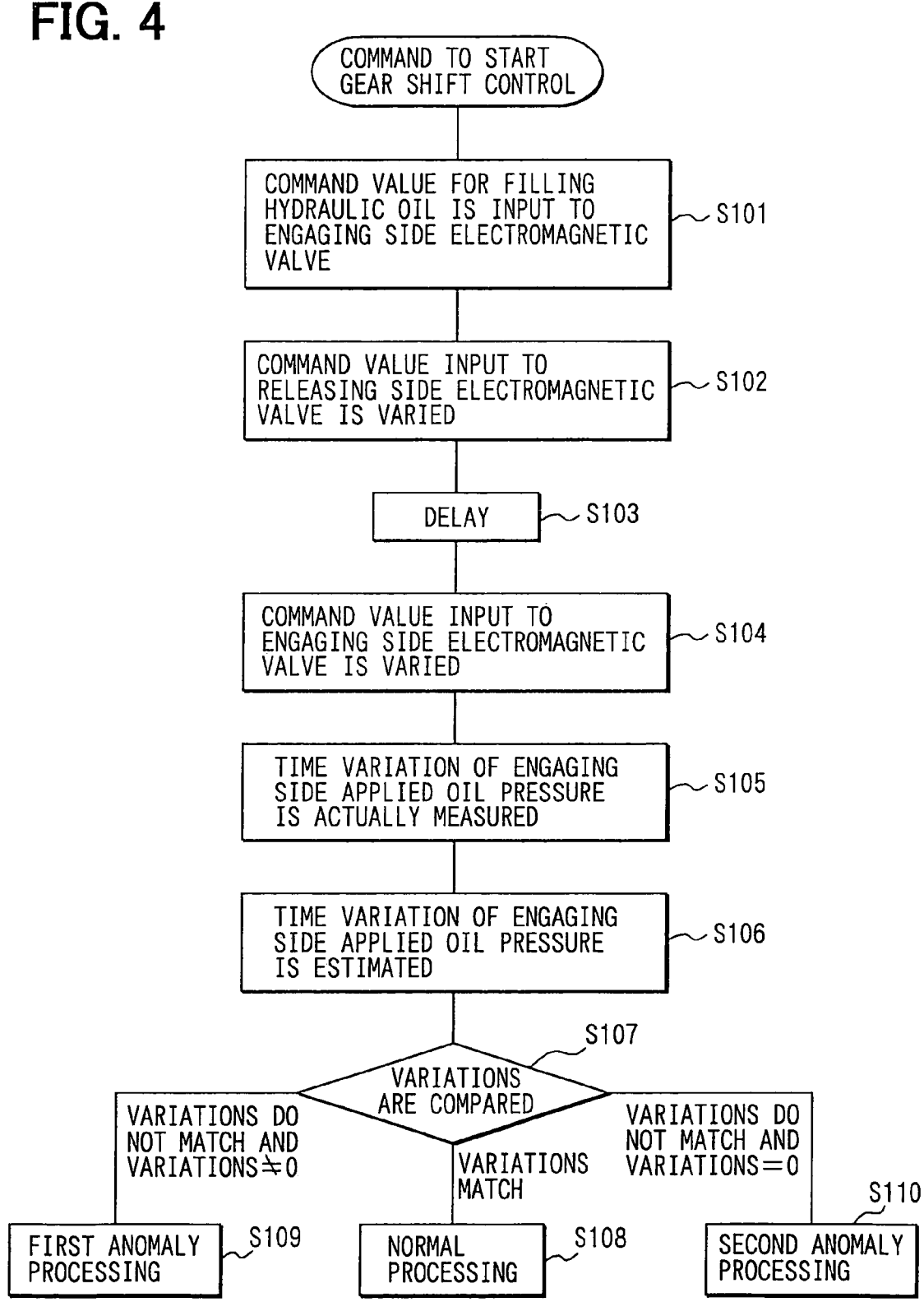
FIG. 4 is a flow chart of the gear shift control processing according to the first embodiment of the present invention.
Figure 5:
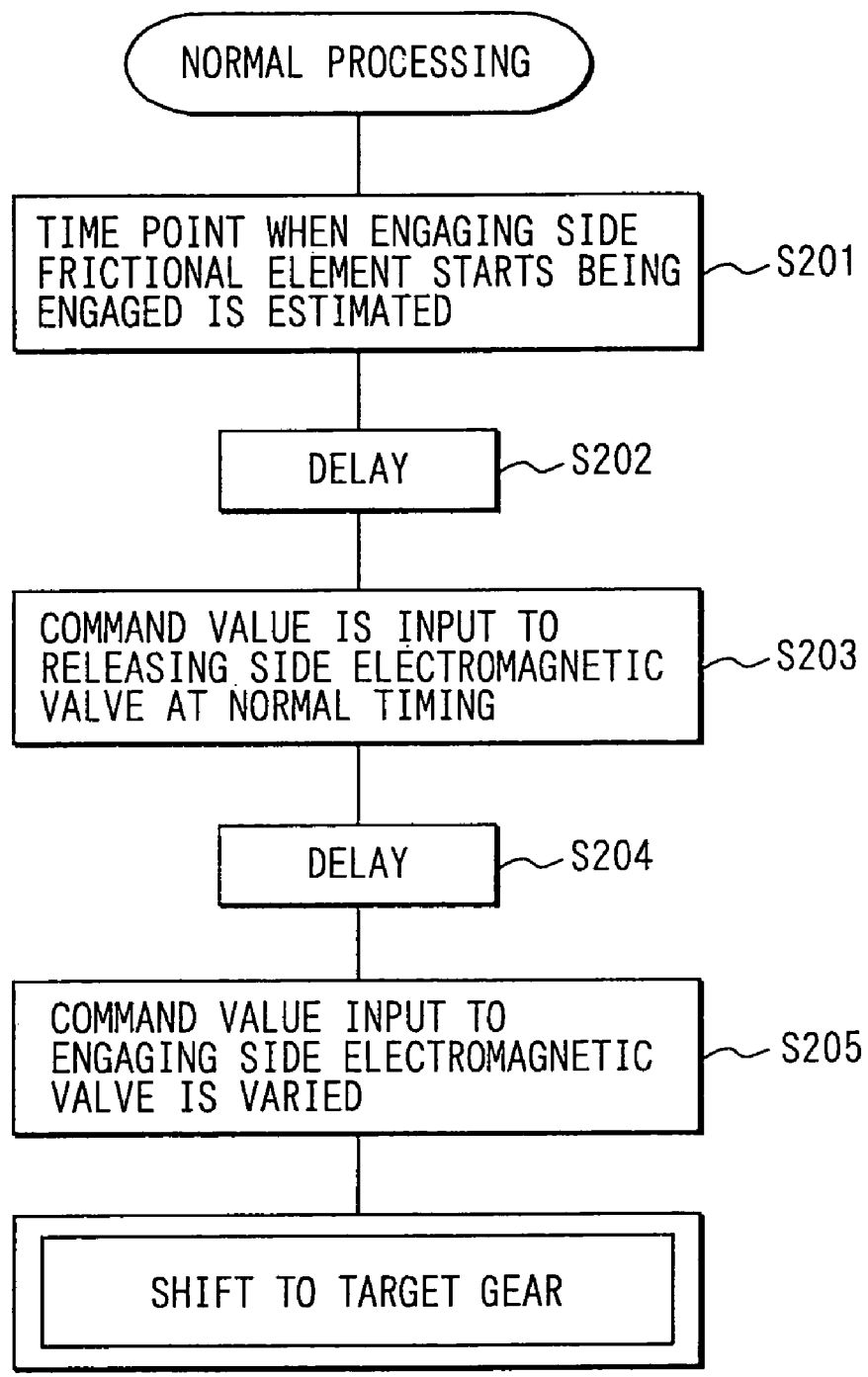
FIG. 5 is a flow chart of normal processing performed in step S108 in FIG. 4.
Figure 6:
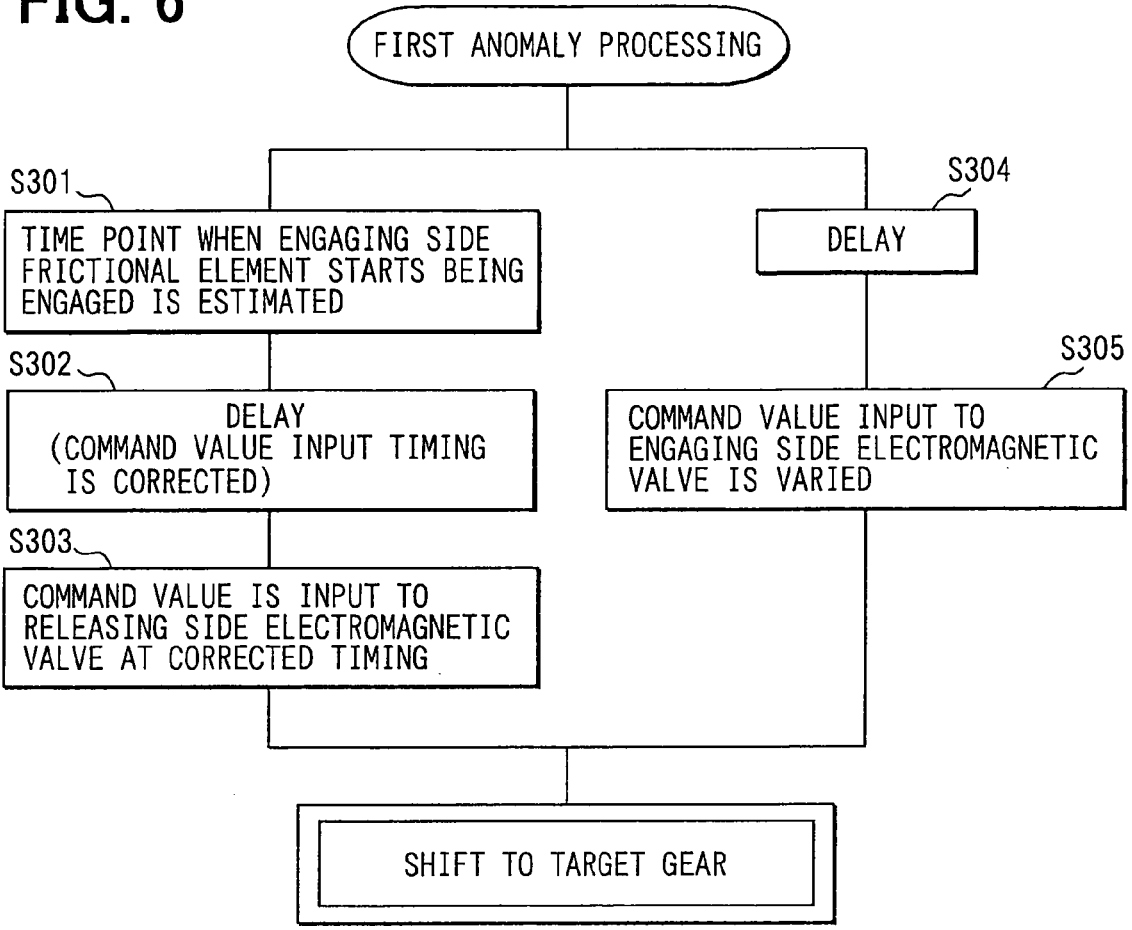
FIG. 6 is a flow chart of the first anomaly processing performed in step S109 of FIG. 4.
Figure 7:
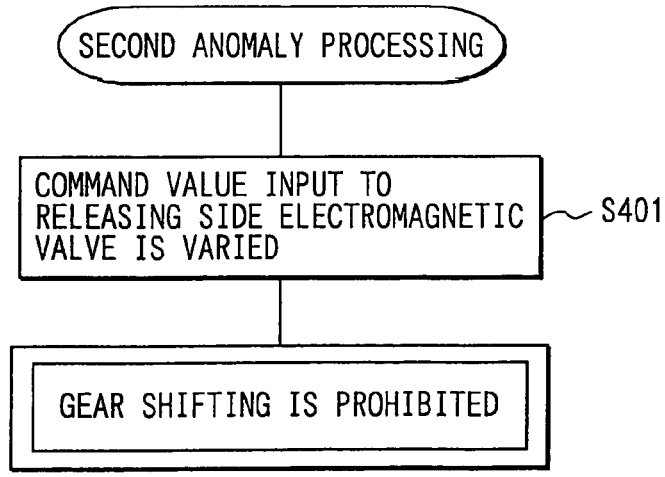
FIG. 7 is a flow chart of the second anomaly processing performed in step S110 of FIG. 4.

As shown in FIG. 3, the ECU 20 sets a command value input to an electromagnetic valve 16 at a value of at least Dmin but not greater than Dmax. For example, when the command value is a duty ratio, Dmin is set at 0% and Dmax is set at 100%. The electromagnetic valve 16 adjusts the oil pressure applied to the frictional element 4 to a value which is proportional to the command value set by the ECU 20. More specifically, when the command value is set at Dmin, the electromagnetic valve 16 adjusts the applied oil pressure to a minimum pressure Pmin that is for completely releasing the frictional element 4. When the command value is set at Dmax, the electromagnetic valve 16 adjusts the applied oil pressure to a maximum pressure Pmax that is for completely engaging the frictional element 4. When the command value is set at a predetermined value Db that is greater than Dmin and smaller than Dmax, the electromagnetic valve 16 adjusts the applied oil pressure to an intermediate pressure Pb that is higher than Pmin and lower than Pmax and is for starting the engagement of the frictional element 4 that is in the released state. This intermediate pressure Pb may also be defined as an oil pressure that, if lowered slightly, starts releasing the frictional element 4, and shall be referred to hereinbelow as the boundary pressure Pb. It should be noted that the boundary pressure Pb varies according to a torque input from the vehicle engine to the automatic transmission 2, and, can be estimated, for example, by detecting a rotational speed of the input shaft of the automatic transmission 2.

For shifting the gear(s) of the automatic transmission 2, the ECU 20 varies the command value from Dmin to Dmax that is given to the electromagnetic valve (engaging-side electromagnetic valve) 16 corresponding to the frictional element (engaging-side frictional element) 4 to be engaged for achieving the target gear. Simultaneously, the command value is varied from Dmax to Dmin that is given to the electromagnetic valve (releasing-side electromagnetic valve) 16 corresponding to the frictional element (releasing-side frictional element) 4 to be released for achieving the target gear. The oil pressure applied to the engaging-side frictional element 4 and releasing-side frictional element 4 is varied in response to the change of the command value, but the oil pressure cannot normally be applied to these fictional elements 4 normally if any anomaly occurs in the control device 10 or automatic transmission 2. Therefore, according to the present embodiment, countermeasures to such an anomaly are taken by the ECU 20 performing control processing of the gear shifting according to the aforementioned control program.

Figure 1:
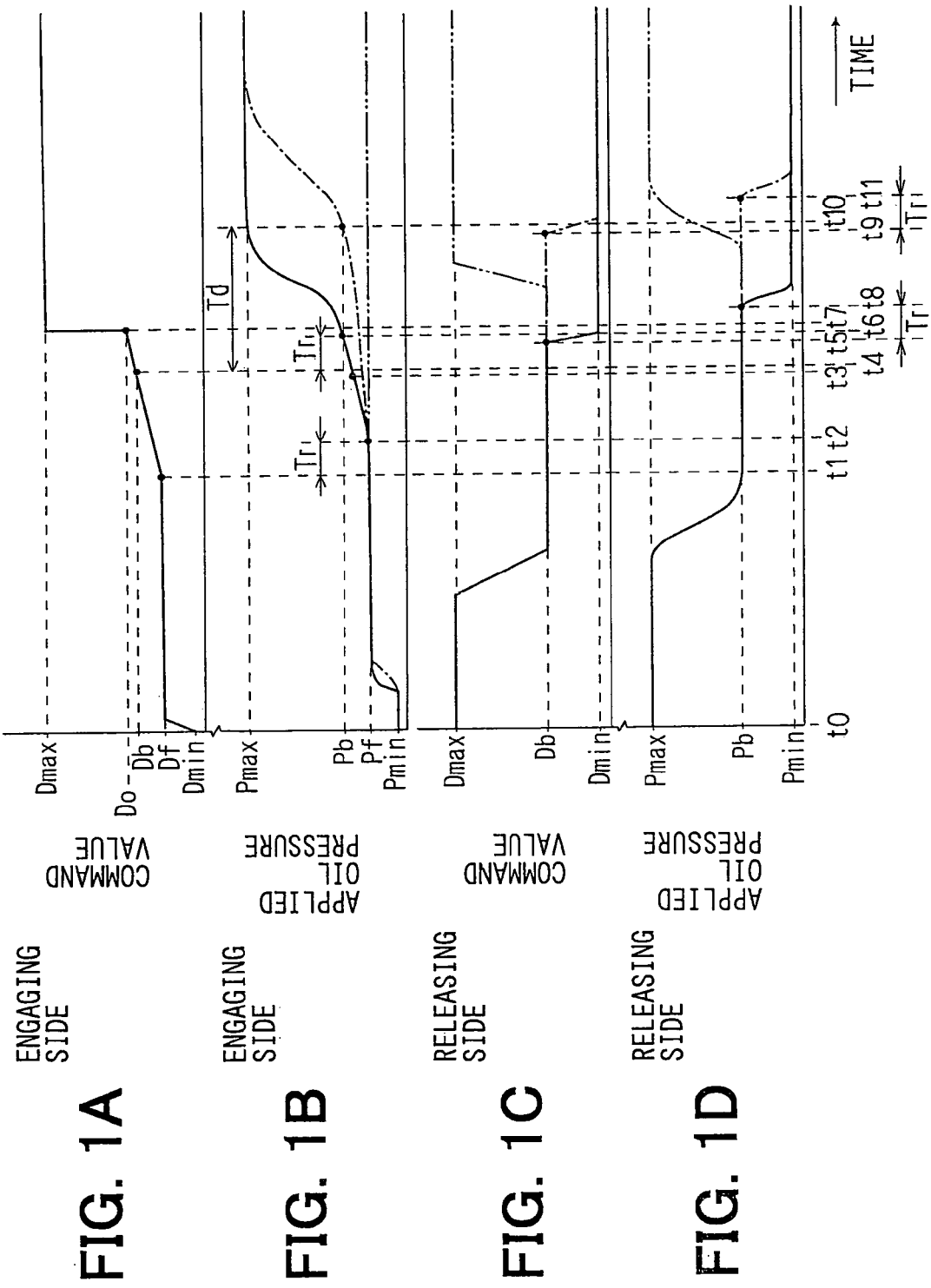
FIGS. 1A–1D are characteristic graphs of the gear shift control processing according to a first embodiment of the present invention.

Now, the gear shift control processing performed by the ECU 20 will be described with reference to FIG. 4 and FIGS. 1A–1D. It is assumed that the control processing starts at a time point t0 when the "D" range is selected with the shift lever in the state where the engine is driven and it is determined by the ECU 20 that the gear shift control is started. FIG. 1A shows the time variation of the command value given to the engaging-side electromagnetic valve 16 for attaining the target gear after the start of this processing, while FIG. 1B shows the time variation of the oil pressure (engaging-side applied oil pressure) applied to the engaging-side frictional element 4 by the engaging-side electromagnetic valve 16 according to the command value. FIG. 1C shows the time variation of the command value given to the releasing-side electromagnetic valve 16 after the start of this processing, while FIG. 1D shows the time variation of the oil pressure (releasing-side applied oil pressure) applied to the releasing-side frictional element 4 by the releasing-side electromagnetic valve 16 according to the command value.

First, in step S101 (hereinbelow, referred to simply as step S101 and the same is applied to the other steps), a predetermined command value Df that is larger than Dmin and smaller than Db is input to an engaging-side electromagnetic valve 16. As a result, the engaging-side electromagnetic valve 16 raises the output pressure to a predetermined oil pressure Pf that is higher than the minimum pressure Pmin and lower than the boundary pressure Pb so that the communicating path 34 serving as a passage is filled with hydraulic oil. The filling of hydraulic oil is continued until a time point t1 (hereinbelow, referred to simply as t1 and the same is applied to other time points), when it becomes possible that an appropriate oil pressure can be assuredly applied to the engaging-side frictional element 4 assuredly.

In step S102, the command value input to the releasing-side electromagnetic valve 16 is varied from Dmax to Db, so that the releasing-side electromagnetic valve 16 lowers the releasing-side applied oil pressure from the maximum pressure Pmax to the boundary pressure Pb. In step S103, the transition to step S104 is delayed until t1 when the filling of hydraulic oil in the communicating path 34 is completed.

In step S104, the command value input to the engaging-side electromagnetic valve 16 is varied from Df towards Db. Here, it is assumed that the command value has a fixed time variation r so that the command value is increased proportionally to time. The change of the command value is continued until t7 when the command value exceeds Db and reaches a predetermined value Do that is smaller than Dmax. It should be noted that the magnitude of the command value Do is set such that engaging-side applied oil pressure assuredly exceeds the boundary pressure Pb within the period from t1 to t7, in consideration of an error range of the applied oil pressure for the command value. Further, the length of the period from t1 to t7 during which the command value is to be varied and the time variation r of the command value are set such that both the decrease of gear shift shock and shortening of the gear shift time can be achieved during normal operation.

In step S105, the time variation R of the engaging-side applied oil pressure is determined by actual measurement on the basis of a signal output by the applied oil pressure sensor 18 detecting the engaging-side applied oil pressure. Here, the time variation R in the period of t2 to t3 is calculated from the engaging-side applied oil pressure detected at t2 when the engaging-side applied oil pressure starts varying in response to the change of the command value in step S104, and the engaging-side applied oil pressure detected at t3 after the lapse of predetermined time from t2. The length of the period of t2 to t3 is set according to an accuracy required for calculating the time variation R.

In step S106, the time variation R of the engaging-side applied oil pressure is estimated on the basis of the command value given to the engaging-side electromagnetic valve 16 that has been varied in step S104. Here, an estimated variation R' or an estimated value of the time variation R is determined as follows. In the first step, the engaging-side applied oil pressure at t2 is estimated on the basis of the command value designating that oil pressure, and the engaging-side applied oil pressure at t3 is estimated on the basis of the command value designating that oil pressure. Both take into consideration a response delay time Tr for which response of the applied oil pressure to the command value is delayed (e.g. time interval indicated by Tr in FIG. 1). Then, the estimated variation R' in the period of t2 to t3 is determined on the basis of the thus estimated engaging-side applied oil pressure values at t2 and t3. The response delay time Tr varies in accordance with oil temperature of hydraulic oil and can be estimated by detecting the oil temperature.

In step S107, the time variation R determined in step S105 is compared with the estimated variation R' determined in step S106. If the comparison finds that the time variation R and the estimated variation R' mutually match within a predetermined error range, namely during the normal operation (see the solid line graph in FIG. 1B), it is determined that the gear shifting is permissive and the processing proceeds to step S108, where normal processing is conducted. On the other hand, if the comparison finds that the time variation R does not match the estimated variation R' but is not zero, namely during a first anomaly (see the dash-dot line graph in FIG. 1B), it is determined that the gear shifting is permissive on the condition that the input timing of the command value is corrected. The processing proceeds to step S109, where a first anomaly processing is conducted. Further, if the comparison finds that the time variation R does not match the estimated variation R' and is substantially zero, namely during a second anomaly (see the two-dot chain line graph in FIG. 1B), it is determined that the gear shifting is prohibited and the processing proceeds to step S110, where a second anomaly processing is conducted.

First, the normal processing in step S108 will be described with reference to FIG. 5 and FIGS. 1A–1D. In step S201 of the normal processing, t6 is estimated. t6 is the time when the engaging-side applied oil pressure reaches the boundary pressure Pb, that is, when the engagement of the engaging-side frictional element 4 begins. It is assumed here that t6 corresponds to the time point when the response delay time Tr has elapsed from t4 when the command value Db designating the boundary pressure Pb was given to the engaging-side electromagnetic valve 16. In step S202, the transition to step S203 is delayed until t5 that is set between t4 and t6.

In step S203, as shown by the solid line graph in FIG. 1C, the command value input to the releasing-side electromagnetic valve 16 is varied from Db to Dmin. In other words, the command value Dmin is input to the releasing-side electromagnetic valve 16 at t5 that is normal timing. Upon receiving the command value Dmin, there leasing-side electromagnetic valve 16 lowers the releasing-side applied oil pressure from the boundary pressure Pb to the minimum pressure Pmin, as shown by the solid line graph in FIG. 1D. The releasing-side applied oil pressure then starts varying from t8, after the lapse of the response delay time Tr from t5. In other words, the releasing-side frictional element 4 begins being released from t8 later than t6 when the engaging-side frictional element 4 begins being engaged. As a result, it is possible to prevent the problem of both the releasing and engaging-side frictional elements 4 being released simultaneously to race the engine. As a result of the foregoing processing, the releasing-side frictional element 4 is completely released.

In step S204, the transition to step S205 is delayed until t7 when the command value Do is provided to the engaging-side electromagnetic valve 16. In step S205, as shown by the solid line graph in FIG. 1A, the command value input to the engaging-side electromagnetic valve 16 is varied all at once from Do to Dmax. As a result, the engaging-side electromagnetic valve 16 raises the engaging-side applied oil pressure to the maximum pressure Pmax as shown by the solid line graph in FIG. 1B. The engaging-side frictional element 4 is thus completely engaged. The target gear shifting is thus attained by the foregoing normal processing.

Next, the first anomaly processing of step S109 will be described with reference to FIG. 6 and FIGS. 1A–1D. In step S301, t10 is estimated. "t10" is the time when the engaging-side applied oil pressure reaches the boundary pressure Pb, that is, when the engaging-side frictional element 4 starts being engaged. For example, if the comparison in step S107 finds that the time variation R is smaller than the estimated variation R' (seethe dash-dot line graph in FIG. 1B), t10 is later than t6 estimated by the normal processing. Therefore, t10 is estimated by determining a delay time Td from t4 when the command value Db, designating the boundary pressure Pb, was given to the engaging-side electromagnetic valve 16, on the basis of the time variation R, the estimated variation R', and the response delay time Tr.

In step S302, the transition to step S303 is delayed until t9, which is set between t4 and t10. Here, t9 is set such that the length of the period of t9 to t10 substantially matches the length of the period of t5 to t6 as described in relation to the normal processing.

In step S303, as shown by the dash-dot line in FIG. 1C, the command value input to the releasing-side electromagnetic valve 16 is varied from Db to Dmin. In other words, the command value Dmin is input to the releasing-side electromagnetic valve 16 at t9, and this t9 can be assumed as a corrected timing obtained by correcting t5, which is the corresponding counterpart in the normal processing by the execution of step S302. Receiving the input of the command value Dmin, the releasing-side electromagnetic valve 16 lowers the releasing-side applied oil pressure from the boundary pressure Pb to the minimum pressure Pmin, as shown by the dash-dot line in FIG. 1D. The releasing-side applied oil pressure then begins being varied from t11 after the lapse of the response delay time Tr from t9. In other words, the releasing-side frictional element 4 starts being released from t11 later than t10 when the engaging-side frictional element 4 begins being engaged. Moreover, due to the setting of t9 in step S302, the relationship between t10 and t11 becomes substantially the same as the relationship between t6 and t8 in normal processing. Consequently, it becomes possible, without causing gear shift shock, to prevent the problem of both the releasing and engaging-side frictional elements 4 from being released simultaneously, which causes the engine to race. As a result, the releasing-side frictional element 4 is completely released. According to the present embodiment, the command value Dmin corresponds to a permission command value and complete release command value.

In the first anomaly processing, step S304 and step S305 are executed along with the execution of step S301 to step S303. After the execution of step S107, the transition to step S305 is delayed to t7 in step S304 in the same manner as in step S204 of the normal processing. In the following step S305, the command value input to the engaging-side electromagnetic valve 16 is varied to Dmax in the same manner as in step S205 of the normal processing. As a result, the engaging-side electromagnetic valve 16 adjusts the engaging-side applied oil pressure to the maximum pressure Pmax as shown by the dash-dot line graph in FIG. 1B, and thereby the engaging-side frictional element 4 becomes completely engaged. By the foregoing first anomaly processing, the timing at which the command value is input to the releasing-side electromagnetic valve 16 is corrected appropriately so that the target gear shifting can be attained.

Next, the second anomaly processing in step S110 will be described with reference to FIGS. 7 and FIGS. 1A–1D. In step S401 of the second anomaly processing, as shown by the two-dot chain line graph in FIG. 1C, the command value input to the releasing-side electromagnetic valve 16 is varied from Db to Dmax after the lapse of a predetermined time from the execution of step S107. The releasing-side electromagnetic valve 16 thereby raises the releasing-side applied oil pressure from the boundary pressure Pb to the maximum pressure Pmax, as shown by the two-dot chain line graph in FIG. 1D. Consequently, the releasing-side frictional element 4 is returned to the completely engaged state. In the present embodiment, the command value Dmax corresponds to a complete engagement command value. The timing at which the command value is input to the releasing-side electromagnetic valve 16 in step S401 can be set as required, and, for example, may be set at a time point after the variations R and R' are compared again after waiting for the command value input to the engaging-side electromagnetic valve 16 to become a value to make the engaging-side applied oil pressure high.

The second anomaly processing is executed when the engaging-side applied oil pressure does not vary from an oil pressure Pf that is lower than the boundary pressure Pb even though the command value has been varied from Df in step S104. Accordingly, the engaging-side frictional element 4 is in the released state when step S401 is executed. By the foregoing second anomaly processing, the gear shifting to the target gear is prohibited.

As described in the above, in the gear shift control processing according to the present embodiment, it is determined whether the gear shifting is permissive or not by monitoring the time variation R of the engaging-side applied oil pressure and comparing the same with the estimated variation R'. Therefore, such determination can be performed rapidly without waiting for the engaging-side applied oil pressure to reach a predetermined value.

Moreover, since the time variation R of the engaging-side applied oil pressure is monitored after the communicating path 34 for transmitting oil pressure to the engaging-side frictional element 4 has been filled with hydraulic oil, the change of the engaging-side applied oil pressure can be accurately detected. Therefore, the determination of permitting gear shifting can be made correctly during normal operation and during the first anomaly in which the engaging-side applied oil pressure varies, while the gear shifting can be performed reliably by the normal or first anomaly processing. Further, the determination of prohibiting gear shifting is made correctly during the second anomaly in which no change is found in the engaging-side applied oil pressure, and the gear shifting is reliably prohibited by the second anomaly processing.

(Second Embodiment)

Figure 8:
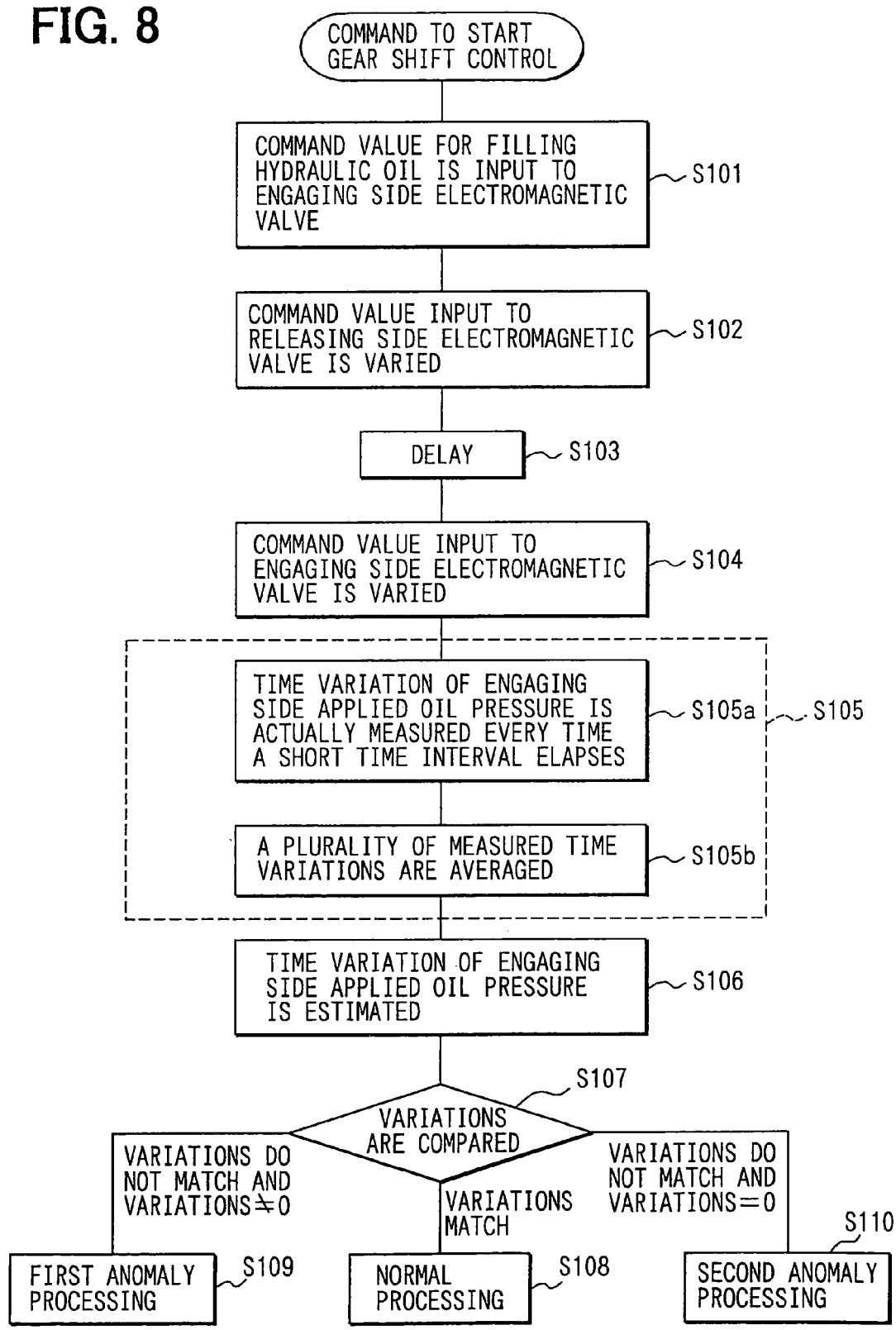
FIG. 8 is a flow chart of the gear shift control processing according to a second embodiment of the present invention.

Gear shift processing performed by a control device for an automatic transmission according to a second embodiment of the present invention is shown in FIG. 8. Those component elements substantially similar to the first embodiment are given the same reference numbers.

Figure 9:
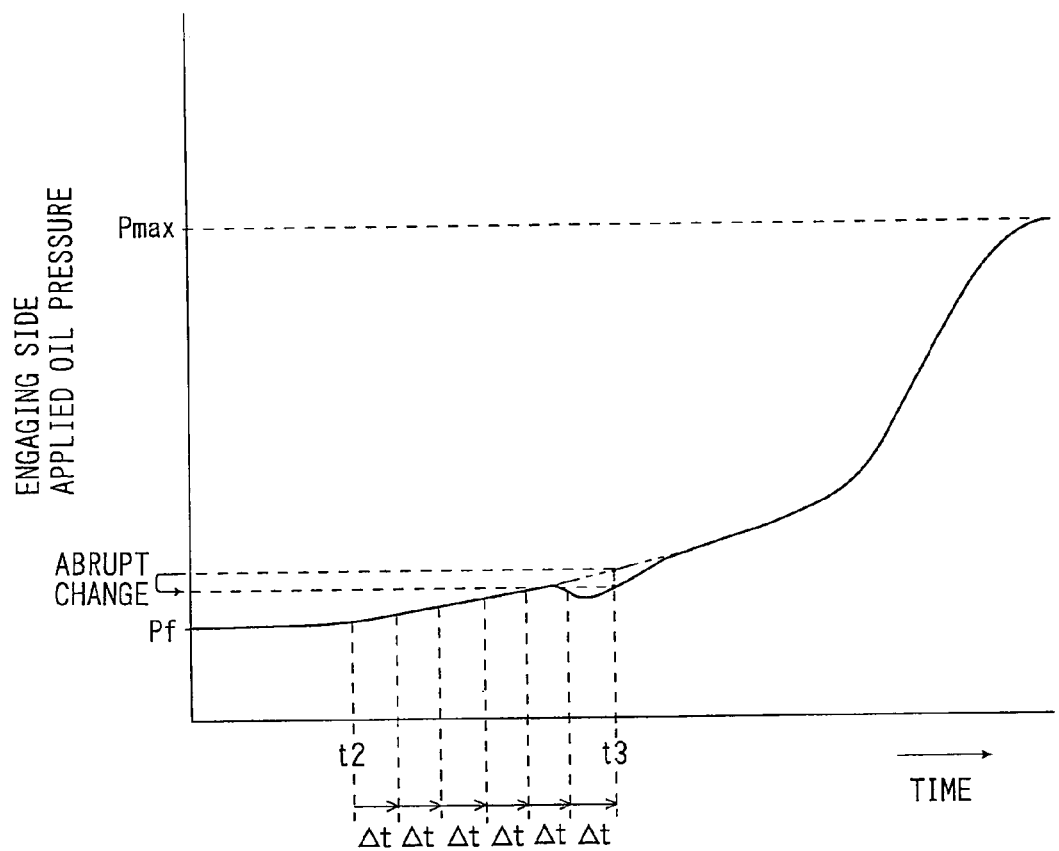
FIG. 9 is a graph of the gear shift control processing according to the second embodiment of the invention.

In step S105 of the gear shift control processing of the first embodiment, the time variation R is determined on the basis of the engaging-side applied oil pressure at the two time points t2 and t3. In this case, if an abrupt change in the engaging-side applied oil pressure accidentally occurs around t3 due to some disturbance or the like as shown in FIG. 9, for example, it may become impossible to obtain time variation R correctly. To solve this problem, in the gear shift control processing according to the second embodiment, the time variation R is determined in step S105 by first dividing the period of t2 to t3 into a plurality of small time intervals Δt in step S105a. Then, a time variation Rp of the engaging-side applied oil pressure is determined on the basis of an output signal from the applied oil pressure sensor 18 that detects the engaging-side applied oil pressure, by actually measuring the time variation Rp every time one small time interval Δt lapses for the period of time from t2 to the time point when such lapse occurs. This actual measurement of the time variation Rp in step S105a is continued up to t3. Upon reaching t3, instep S105b, the time variation R is calculated by averaging the plurality of time variations Rp determined in step S105a. Since the time variation R is obtained as an average value of the time variations Rp obtained in time series, it is possible to minimize the effects of any possible abrupt changes of the engaging-side applied oil pressure. Consequently, the accuracy of determination performed in step S107 based on such time variation R can be improved.

(Third Embodiment)

Figure 10:
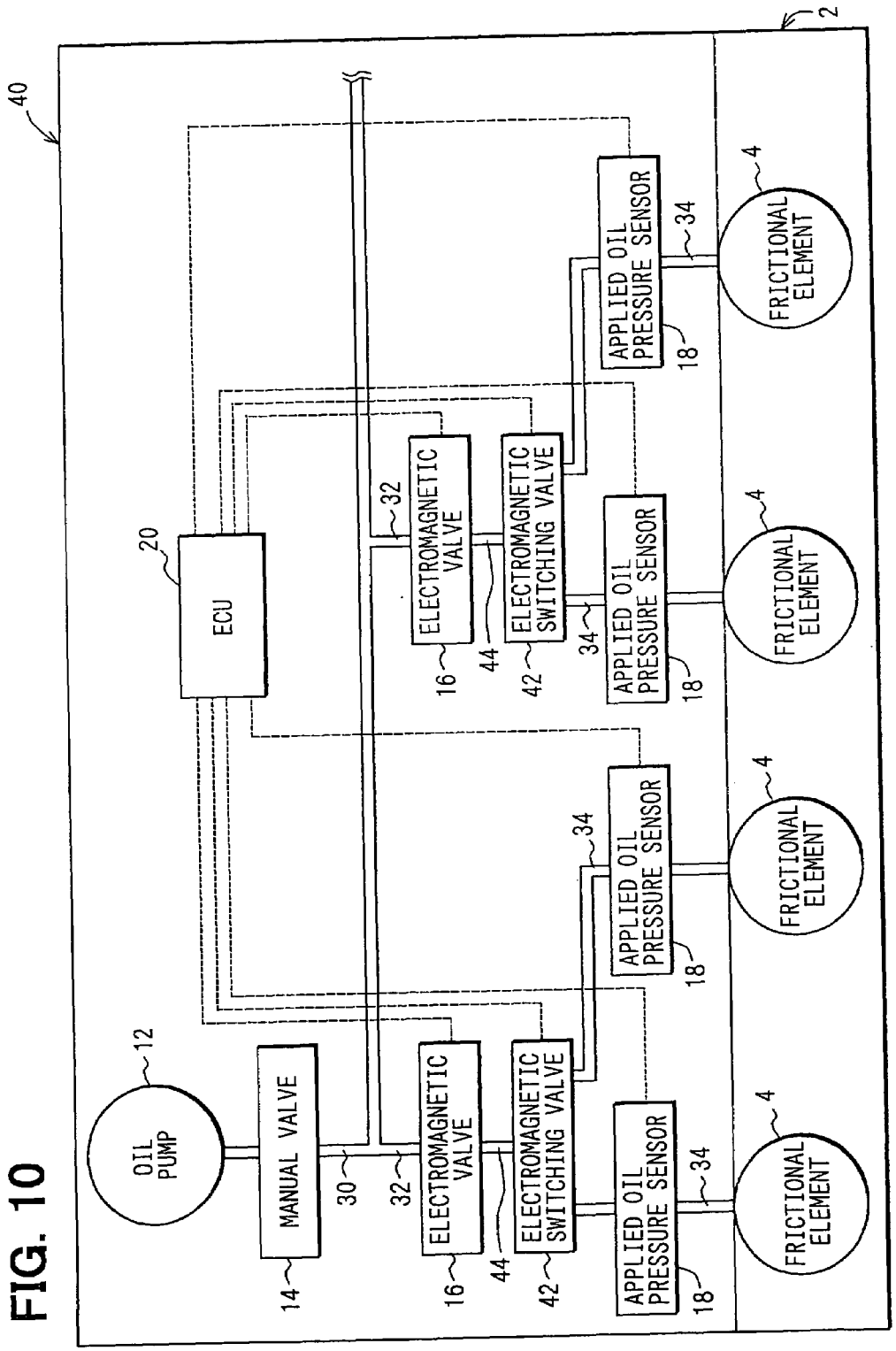
FIG. 10 is a block diagram of a control device for an automatic transmission according to a third embodiment of the present invention.

A control device for an automatic transmission according to a third embodiment of the present invention is shown in FIG. 10. Those component elements are substantially the same as in the first embodiment and are given the same reference numbers. In the control device 40 of the third embodiment, a plurality of electromagnetic switching valves 42 are each connected to one of a plurality of electromagnetic valves 16 via respective separate communicating paths 44. A couple of frictional elements 4 are connected to each of the electromagnetic switching valves 42 via respective separate communicating paths 34. The electromagnetic switching valves 42 are electrically connected to an ECU 20, and one of the corresponding two communicating paths 34 that is selected by the ECU 20 is made to communicate with the communicating path 44. An output pressure from the electromagnetic valve 16 is applied to a frictional element 4 that is connected with the communicating path 34 that communicates with the communicating path 44 via the electromagnetic switching valve 42. Applied oil pressure sensors 18 each detect oil pressure applied to the corresponding frictional element 4 via the corresponding communicating path 34.

In the gear shift control processing according to the third embodiment, an engaging-side frictional element 4 and a releasing-side frictional element 4 are selected by the ECU 20 from among the frictional elements 4 connected with the communicating paths 34 that communicates with the communicating paths 44 via the electromagnetic switching valves 42. Thus, the gear shift control processing can be executed in a similar manner as in the first embodiment. It should be noted that, according to the third embodiment, the gear shifting can also be performed by switching the communicating paths 34 that communicate with the communicating paths 44 by means of the electromagnetic switching valves 42.

In the foregoing plurality of embodiments of the present invention, the time variation is monitored for hydraulic pressure (oil pressure) applied to the engaging-side frictional element that engages in the target gear, so that it is determined whether gear shifting is permissive or not based on the time variation. However, the time variation also may be monitored for hydraulic pressure applied to the releasing-side frictional element that is released in the target gear, so that it is determined whether gear shifting is permissive or not based on the time variation.

Further, in the foregoing plurality of embodiments of the present invention, the pressure adjusting means is constituted by electromagnetic valves that adjust hydraulic pressure (oil pressure) applied to a frictional element based on a command value. However, it is also possible to constitute the pressure adjusting means by electromagnetic valves that adjust the command pressure according to a command value and pressure control valves that adjust the hydraulic pressure applied to a frictional element according to the command pressure adjusted by the electromagnetic valve.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control method for an automatic transmission comprising:
   applying a hydraulic pressure of a working fluid to a plurality of frictional elements of the automatic transmission to control shifting of sears of the automatic transmission;
   varying a command value given to means for adjusting pressure of the working fluid; and
   determining whether gear shifting is permissive or not based on time variation of the hydraulic pressure applied to the frictional element that is adjusted by the pressure adjusting means according to the command value and detected by a means for detection of hydraulic pressure;
   wherein when the hydraulic pressure applied to the frictional element to be engaged in a target gear of the gears is defined as an engaging-side applied hydraulic pressure, and the command value for causing the pressure adjusting means to adjust the hydraulic pressure applied to the frictional element to be released in the target gear to a maximum pressure is defined as a complete engagement command value, the method further comprises:
      determining that gear shifting is prohibited if the engaging-side applied hydraulic pressure detected by the detecting means does not vary when the command value is varied; and
      providing the complete engagement command value to the pressure adjusting means.

2. A control method for an automatic transmission comprising:
   applying a hydraulic pressure of a working fluid to a plurality of frictional elements of the automatic transmission to control shifting of gears of the automatic transmission;
   varying a command value given to means for adjusting pressure of the working fluid; and
   determining whether gear shifting is permissive or not based on time variation of the hydraulic pressure applied to the frictional element that is adjusted by the pressure adjusting means according to the command value and detected by a means for detection of hydraulic pressure;
   wherein when the command value for adjusting the applied hydraulic pressure to achieve gear shifting in a target gear is defined as a permissive command value, the method further comprising;
   determining that the gear shifting is to be permitted if the applied hydraulic pressure detected by the detecting means varies when the command value is varied; and
   providing the permissive command value to the pressure adjusting means; and
   estimating a time variation of the applied hydraulic pressure based on the command value that has been varied; and
   wherein if the estimated time variation matches actual time variation, giving the permissive command value to the pressure adjusting means at a normal timing.

3. The control method for an automatic transmission according to claim 2, wherein when the hydraulic pressure applied to the frictional element to be engaged in the target gear of the gears is defined as an engaging-side applied hydraulic pressure, the method further comprises:
   varying the command value after a passage for transmitting the engaging-side applied hydraulic pressure has been filled with working fluid; and
   determining the estimated time variation to be compared with the time variation of the engaging-side applied hydraulic pressure.

4. The control method for an automatic transmission according to claim 2, further comprising:
   correcting the normal timing if the estimated time variation does not match the actual time variation; and
   providing the permissive command value to the pressure adjusting means at a corrected timing.

5. The control method for an automatic transmission according to claim 4, wherein when the hydraulic pressure applied to the frictional element to be engaged in the target gear of the gears is defined as an engaging-side applied hydraulic pressure, and the permissive command value for causing the pressure adjusting means to adjust the hydraulic pressure applied to a releasing-side frictional element to be released in the target gear of the gears to a minimum pressure is defined as a complete release command value, the method further comprises:
   giving the complete release command value to the pressure adjusting means at the corrected timing if the time variation of the engaging-side applied hydraulic pressure does not match the estimated time variation, the time variation being detected by the detecting means when the command value is varied.

6. A control device for an automatic transmission for applying a hydraulic pressure of a working fluid to a plurality of frictional elements of the automatic transmission to control shifting of gears of the automatic transmission, the device comprising:
   means for adjusting a hydraulic pressure applied to at least one of the frictional elements according to a command value;
   means for detecting the applied hydraulic pressure; and
   means for varying the command value given to the pressure adjusting means and for determining whether gear shifting is permissive or not based on time variation of the applied hydraulic pressure detected by the detecting means;
   wherein when the hydraulic pressure applied to the frictional element to be engaged in a target gear of the gears is defined as an engaging-side applied hydraulic pressure, and the command value for causing the pressure adjusting means to adjust the hydraulic pressure applied to the frictional element to be released in the target gear to a maximum pressure is defined as a complete engagement command value, the varying and determining means decides that gear shifting is to be prohibited if the engaging-side applied hydraulic pressure detected by the detecting means does not vary when the command value is varied; and providing the complete engagement command value to the pressure adjusting means.

7. A control device for an automatic transmission for applying a hydraulic pressure of a working fluid to a plurality of frictional elements of the automatic transmission to control shifting of gears of the automatic transmission, the device comprising:

means for adjusting a hydraulic pressure applied to at least one of the frictional elements according to a command value;

means for detecting the applied hydraulic pressure; and means for varying the command value given to the pressure adjusting means and for determining whether gear shifting is permissive or not based on time variation of the applied hydraulic pressure detected by the detecting means;

wherein when the command value for adjusting the applied hydraulic pressure to achieve gear shifting in a target gear is defined as a permissive command value, the varying and determining means determines that the gear shifting is to e permitted if the applied hydraulic pressure detected by the detecting means varies when the command value is varied, and provides the permissive command value of the pressure adjusting means; and wherein the varying and determining means estimates the time variation of the applied hydraulic pressure based on the command value that has been varied, and if an estimated time variation matches actual time variation, gives the permissive command value to the pressure adjusting means at a normal timing.

8. The control device for an automatic transmission according to claim 7, wherein when the hydraulic pressure applied to the frictional element to be engaged in the target gear of the gears is defined as an engaging-side applied hydraulic pressure, the varying and determining means varies the command value after a passage for transmitting the engaging-side applied hydraulic pressure has been filled with working fluid, and determines the estimated time variation to be compared with a time variation of the engaging-side applied hydraulic pressure.

9. The control device for an automatic transmission according to claim 7, wherein the varying and determining means corrects the normal timing if the estimated time variation does not match actual time variation, and gives the permissive command value to the pressure adjusting means at a corrected timing.

10. The control device for an automatic transmission according to claim 9, wherein when the hydraulic pressure applied to the frictional element to be engaged in the target gear of the gears is defined as an engaging-side applied hydraulic pressure, and the permissive command value for causing the pressure adjusting means to adjust the hydraulic pressure applied to a releasing-side frictional element to be released in the target gear of the gears to a minimum pressure is defined as a complete release command value, the varying and determining means gives the complete release command value to the pressure adjusting means at the corrected timing if the time variation of the engaging-side applied hydraulic pressure does not match the estimated time variation, the time variation being detected by the detecting means when the command value is varied.

* * * * *